United States Patent
Zawadzki et al.

(10) Patent No.: US 12,000,066 B2
(45) Date of Patent: Jun. 4, 2024

(54) CROSS-LINKED CELLULOSIC FIBERS

(71) Applicant: Kimberly-Clark Worldwide, Inc., Neenah, WI (US)

(72) Inventors: Michael Andrew Zawadzki, Appleton, WI (US); Stephen Michael Lindsay, Appleton, WI (US)

( * ) Notice: Subject to any disclaimer, the term of this patent is extended or adjusted under 35 U.S.C. 154(b) by 903 days.

(21) Appl. No.: 16/982,824

(22) PCT Filed: Mar. 29, 2018

(86) PCT No.: PCT/US2018/025005
§ 371 (c)(1),
(2) Date: Sep. 21, 2020

(87) PCT Pub. No.: WO2019/190513
PCT Pub. Date: Oct. 3, 2019

(65) Prior Publication Data
US 2021/0054532 A1  Feb. 25, 2021

(51) Int. Cl.
| | | |
|---|---|---|
| D01D 5/38 | (2006.01) | |
| C08B 15/10 | (2006.01) | |
| D01D 5/22 | (2006.01) | |
| D06L 4/13 | (2017.01) | |
| D21H 11/18 | (2006.01) | |
| D21H 11/20 | (2006.01) | |

(52) U.S. Cl.
CPC ............... D01D 5/38 (2013.01); C08B 15/10 (2013.01); D01D 5/22 (2013.01); D06L 4/13 (2017.01); D21H 11/18 (2013.01); D21H 11/20 (2013.01)

(58) Field of Classification Search
CPC ... D01D 5/37; D01D 5/22; D06L 4/13; C08B 15/10; D21H 11/18; D21H 11/20
See application file for complete search history.

(56) References Cited

U.S. PATENT DOCUMENTS

| | | | |
|---|---|---|---|
| 3,297,604 A | 1/1967 | Germino | |
| 3,320,066 A | 5/1967 | Garth | |
| 4,888,093 A * | 12/1989 | Dean | D06M 13/12 162/158 |
| 5,554,745 A | 9/1996 | Chiu et al. | |
| 6,179,962 B1 | 1/2001 | Brady et al. | |
| 6,984,290 B2 | 1/2006 | Runge et al. | |
| 7,160,420 B2 | 1/2007 | Helbling et al. | |
| 2003/0024662 A1 | 2/2003 | Besemer et al. | |
| 2003/0209336 A1 | 11/2003 | Cimecioglu et al. | |
| 2005/0217811 A1 * | 10/2005 | Stephens | D21H 11/20 162/162 |
| 2005/0217812 A1 * | 10/2005 | Stoyanov | D21C 9/001 604/378 |
| 2007/0270608 A1 | 11/2007 | Boersma et al. | |
| 2008/0105393 A1 | 5/2008 | Besemer et al. | |
| 2010/0143738 A1 | 6/2010 | Bloembergen et al. | |

FOREIGN PATENT DOCUMENTS

| | | | | |
|---|---|---|---|---|
| CN | 106758217 A | 5/2017 | | |
| DE | 10009034 A1 | 9/2001 | | |
| WO | 14089578 A1 | 6/2014 | | |
| WO | 15168662 A1 | 11/2015 | | |
| WO | 16197146 A1 | 12/2016 | | |
| WO | WO2016/197146 | * 12/2016 | ............ | D06M 11/00 |
| WO | WO 2016197146 | * 12/2016 | ............ | D06M 11/00 |

OTHER PUBLICATIONS

Dastidar, Trina Ghosh et al., "A soy flour based thermoset resin without the use of any external crosslinker", Green Chemistry, 2013, http://pubs.rsc.org/en/content/articlelanding/2013/gc/c3gc40887f#!divAbstract.

Canisag, Hazal, "Bio-Crosslinking of Starch Films with Oxidized Sucrose", University of Nebraska, 2014, http://digitalcommons.unl.edu/cgi/viewcontent.cgi?article=1006&context=textilesdiss.

Xu, Helan et al., "Robust and Flexible Films from 100% Starch Cross-Linked by Biobased Disaccharide Derivative", ACS Sustainable Chem., 2015, http://pubs.acs.org/doi/abs/10.1021/acssuschemeng.5b00353.

Fink, Johannes Karl, "Bio-based nanofiber membrane", Marine, Waterborne, and Water-Resistant Polymers: Chemistry and Applications, https://books.google.co.in/books?id=UFe-CgAAQBAJ&pg=PA193&lpg=PA193&dq=oxidized+sucrose+as+crosslinking+agent&source=bl&ots=_ze_3tl0My&sig=DfFlvEjCcP3q0GXowvzEKt5-01k&hl=en&sa=X&ved=0ahUKEwia6cmfzZTSAhWJQ48KHf7rCucQ6AEIPjAF#v=onepage&q=oxidized%20sucrose%20as%20crosslinking%20agent&f=false.

Yang, Qian et al., "Dimensional stability and water repellency of European Aspen improved by oxidized carbohydrates", Bioresource.com, 2013, https://www.ncsu.edu/bioresources/BioRes_08/BioRes_08_1_0487_Yang_Dimen_Stability_Water_Aspen_Carbohyd_3285.pdf.

Liu, Peng et al, "Oxidized Sucrose: A Potent and Biocompatible Crosslinker for Three-Dimensional Fibrous Protein Scaffolds", Wiley Online Library, 2015, http://onlinelibrary.wiley.com/doi/10.1002/mame.201400373/abstract.

(Continued)

Primary Examiner — Amina S Khan
(74) Attorney, Agent, or Firm — KIMBERLY-CLARK WORLDWIDE, INC.

(57) ABSTRACT

Disclosed are processes for manufacturing cross-linked cellulosic fibers and tissue products comprising cross-linked cellulosic fibers, manufactured by reacting an oxidized polyol, in particular, an oxidized sugar having at least two aldehyde groups with a plurality of cellulosic fibers to yield treated fibers and heating the treated fibers at a temperature greater than about 140° C. to cure the treated fibers. In particular, said sugar is sucrose and the oxidising agent comprises hydrogen peroxide. The instant cross-linked fibers are manufactured without well-known cross-linking agents such as formaldehyde or polycarboxylic acids, and have good brightness and color and resist yellowing. Furthermore, the cross-linked cellulosic fibers are generally free from off odors and the instant cross-linked cellulosic fibers have enhanced properties, such as improved wet bulk, compared to uncross-linked fibers.

10 Claims, No Drawings

(56) References Cited

OTHER PUBLICATIONS

Jalaja, K. et al., "Electrospun gelatin nanofibers: a facile cross-linking approach using oxidized sucrose.", Int J Biol Macromol, 2014, https://www.ncbi.nlm.nih.gov/pubmed/25478965.

Lubasova, Daniela et al., "Water-resistant plant protein-based nanofiber membranes", Journal of Applied, 2015, http://search.proquest.com/docview/1660087401/453C8F4B59124392PQ/5?accountid=142944.

* cited by examiner

CROSS-LINKED CELLULOSIC FIBERS

BACKGROUND OF THE DISCLOSURE

Cellulosic fibers are a basic component of a wide range of articles including tissue products such as bath tissue, facial tissue, paper towels, napkins, wipers, and the like. Today there is an ever increasing demand for soft, bulky tissue products, which also have sufficient tensile strength to withstand use. Traditionally the tissue maker has solved the problem of increasing sheet bulk without compromising strength and softness by adopting tissue making processes that only minimally compress the tissue web during manufacture, such as through-air drying. Although such techniques have improved sheet bulk, they have their limitations. For example, to obtain satisfactory softness the through-air dried tissue webs often need to be calendered, which may negate much of the bulk obtained by through-air drying.

Tissue product bulk may also be increased by treating a portion of the papermaking furnish with chemicals that facilitate the formation of covalent bonds between adjacent cellulose molecules. This process is commonly referred to as cross-linking. Some of the first cross-linked cellulosic fibers were prepared by treating cellulosic fibers with formaldehyde and various formaldehyde addition products. Unfortunately, the irritating effect of formaldehyde vapor on the eyes and skin is a marked disadvantage of the fibers. In addition, such cross-linked fibers typically exhibit objectionable odor and have low fiber brightness.

Alternatives to formaldehyde and formaldehyde addition product crosslinking agents have been developed. Among these are dialdehyde crosslinking agents such as those disclosed in U.S. Pat. No. 4,822,453, which describes absorbent structures containing individualized, cross-linked fibers, wherein the crosslinking agent is selected from the group consisting of $C_2$-$C_9$ dialdehydes, with glutaraldehyde being preferred. The reference appears to overcome many of the disadvantages associated with formaldehyde and/or formaldehyde addition products. However, the cost associated with producing fibers cross-linked with dialdehyde crosslinking agents such as glutaraldehyde is considered too high to result in significant commercial success. Therefore, further efforts have been made to improve fiber properties such as color and odor.

Polycarboxylic acids, such as those disclosed in U.S. Pat. Nos. 5,137,537 and 5,183,707, have been used to crosslink cellulosic fibers. These references describe absorbent structures containing individualized cellulosic fibers cross-linked with a $C_2$-$C_9$ polycarboxylic acid. The ester crosslink bonds formed by the polycarboxylic acid crosslinking agents differ from the acetal crosslink bonds that result from the mono- and di-aldehyde crosslinking agents. Absorbent structures made from these individualized, ester-cross-linked fibers exhibit increased dry and wet resilience and have improved responsiveness to wetting relative to structures containing uncross-linked fibers. Furthermore, the preferred polycarboxylic crosslinking agent, citric acid, is available in large quantities at relatively low prices making it commercially competitive with formaldehyde and formaldehyde addition products. Unfortunately, the preferred $C_2$-$C_9$ crosslinking agent, citric acid, can cause discoloration (i.e., yellowing) of the white cellulosic fibers when the treated fibers are cured at the elevated temperatures required for crosslinking. It is known that decomposition of citric acid yields aconitic acid, itaconic acid, citraconic acid, and mesaconic acid. Yellowing may be due to the chromophores produced as a result of the conjugated double bonds produced or due to reactions with the double bonds. In addition, unpleasant odors can also be associated with the use of α-hydroxy polycarboxylic acids such as citric acid. The above-noted references do not describe processes that reduce the odor or increase the brightness of the treated fibers.

While cross-linked fibers prepared using formaldehyde and polycarboxylic acids have advantages compared to non-cross-linked fibers, such as improved bulk, liquid acquisition, and rewet, the process has several drawbacks such as odor, toxicity, cost and low crosslinking efficiencies. The present application seeks to fulfill these needs and provides further related advantages.

SUMMARY OF THE DISCLOSURE

In one embodiment the present invention provides reacting a crosslinking agent comprising an oxidized polyol, such as an oxidized sugar having at least two aldehyde groups, with a plurality of cellulosic fibers, such as wood pulp fibers under conditions effective to cause hydroxyl groups contained in the cellulosic fibers to become crosslinked, thereby yielding a plurality of crosslinked cellulosic fibers.

In another embodiment the present invention provides a method of manufacturing cross-linked cellulosic fibers comprising the steps of: reacting a polyol and an oxidizing agent selected from the group consisting of a periodate, a peroxide, a hypochlorite, and combinations thereof, and optionally a metal ion, to yield an oxidized polyol; providing a plurality of cellulosic fibers; and reacting the cellulosic fibers with the oxidized polyol to yield cross-linked cellulosic fibers. In certain embodiments the reaction of the polyol and oxidizing agent may be carried out in the presence of an enzyme selected from the group consisting of peroxidase, catalase and myeloperoxidase.

In still other embodiments the present invention provides a method of manufacturing cross-linked cellulosic fibers comprising the steps of: providing a sugar selected from the group consisting of glucose, fructose, sucrose, maltose, lactose, mannose, xylose, raffinose, stachyose, and mixtures thereof; providing an oxidizing agent selected from the group consisting of a periodate, a peroxide, a hypochlorite, and combinations thereof; providing a metal ion; reacting the sugar in the presence of the oxidizing agent and the metal ion to yield an oxidized sugar having at least two aldehyde groups; providing a plurality of cellulosic fibers; and reacting the cellulosic fibers with the oxidized sugar to yield cross-linked cellulosic fibers.

In yet other embodiments, the present invention provides a method for the preparation of bleached cross-linked cellulosic fibers comprising the steps of providing a fibrous web of cellulosic fibers, treating the web with an oxidized polyol and a magnesium salt selected from the group consisting of magnesium carbonate, magnesium chloride, magnesium sulfate, and combinations thereof, fiberizing the treated web to provide individualized cross-linked cellulosic fibers, curing individualized cross-linked cellulosic fibers and bleaching the cured individualized cross-linked cellulosic fibers.

In other embodiments, the present invention provides a method of manufacturing a cross-linked fiber comprising the steps of: providing a plurality of cellulosic fibers, treating the plurality of cellulosic fibers with an oxidized polyol and optionally a catalyst comprising a metal salt, to yield a plurality of treated fibers, and drying the treated fibers at a drying temperature greater than about 140° C. to yield a plurality of cross-linked fibers. In certain embodiments the oxidized polyol is an oxidized sugar having at least two aldehyde groups and is mixed with cellulosic fibers at add-ons from about 50 to about 200 kg per metric ton (MT) of fiber and more preferably from about 50 to about 100 kg/MT of fiber.

In other embodiments the present invention provides a method of making a tissue web comprising the steps of: reacting an oxidized polyol, such as oxidized sugar having at least two aldehyde groups, with a plurality of cellulosic fibers to yield a plurality of treated fibers; drying the treated fibers at a drying temperature greater than about 140° C. to yield a plurality of cross-linked fibers; dispersing the cross-linked fibers in water to form a slurry of cross-linked fibers; depositing the slurry of cross-linked fibers on a forming fabric to form a wet tissue web; partially dewatering the wet tissue web and drying the partially dewatered tissue web to a consistency of at least about 95 percent to form a tissue web. Tissue webs prepared as described herein may be converted into tissue product, wherein the tissue product has a basis weight from about 10 to about 50 grams per square meter (gsm) and a sheet bulk of about 5 cubic centimeters per gram (cc/g) or greater.

In still other embodiments the present invention provides a tissue product comprising cross-linked cellulosic fibers, such as from about 5 to about 75 percent, and more preferably from about 10 to about 50 percent and still more preferably from about 15 to about 25 percent, cross-linked cellulosic fibers, by weight of the product, where the sheet bulk of the product is at least about 10 percent greater than the sheet bulk of comparable tissue product, such as a tissue product having substantially equal strength and basis weight, that is substantially free from cross-linked fibers.

DETAILED DESCRIPTION OF THE DISCLOSURE

The present application provides a novel process for manufacturing cross-linked cellulosic fibers, as well as cross-linked fibers prepared by the same and tissue products comprising the novel cross-linked cellulosic fibers. The instant cross-linked fibers are generally manufactured without well-known cross-linking agents such as formaldehyde or polycarboxylic acids. As such the present cross-linked cellulosic fibers have good brightness and color and resist yellowing. Further, the cross-linked cellulosic fibers are generally free from off odors. Like prior art cross-linked fibers however, the instant cross-linked cellulosic fibers have enhanced properties, such as increased bulk and reduced water retention values (WRV). For example, in certain embodiments cross-linked fibers prepared according to the present invention may have a WRV that is at least about 30 percent less than a comparable non-cross-linked fiber, such as at least about 40 percent less and more preferably at least about 50 percent less.

Generally the inventive cross-linked cellulosic fibers are prepared by reacting cellulosic fibers with an oxidized polyol. Oxidized polyols may be prepared by reacting a polyol with an oxidizing agent. The term "polyol" as used herein generally refers to any compound having at least two adjacent —OH groups which are not in trans configuration relative to each other. The polyols can be linear or circular, substituted or unsubstituted, or mixtures thereof, so long as the resultant complex is water-soluble. Such compounds include sugars, sugar alcohols, sugar acids and uronic acids. Preferred polyols are sugars, sugar alcohols and sugar acids. Particularly preferred polyols are sugar alcohols having the general formula $CH_2OH(CHOH)nCH_2OH$, where n may be from 2 to 10. In other embodiments sugars such as glucose, fructose, sucrose, maltose, lactose, mannose, xylose, raffinose and stachyose are preferred. In still other embodiments mixtures of any of the foregoing sugars may be oxidized to provide a cross-linking agent.

Generally formation of cross-linked cellulosic fibers according to the present invention comprises oxidizing a polyol to provide an oxidized polyol, such as an oxidized sugar having at least two aldehyde groups, reacting the oxidized polyol with a cellulosic fiber. Polyols may be oxidized by reacting a polyol with a suitable oxidizing reagent. In certain embodiments the polyol oxidation may be carried out by reacting a polyol with a suitable oxidizing reagent in the presence of a metal ion.

Suitable oxidation reagents include chromium oxidation reagents, lead oxidation reagents, iron oxidation reagents, copper oxidation reagents, mercury oxidation reagents, vanadium oxidation reagents, nickel oxidation reagents, ruthenium oxidation reagents, magnesium oxidation reagents, manganese oxidation reagents, osmium oxidation reagents, hypochlorite, peroxides, periodate oxidation reagents, iodine oxidation reagents, chloride oxidation reagents, oxygen, $O_3$, or mixtures thereof. Other suitable oxidation reagents include, but are not limited to, $Ca(OCl_2)$, $MnO_2$, $KMnO_4$, $BaMnO_4$, $Cu(MnO_4)_2$, $NaMnO_4$, $HgO$, $Pb(OAc)_2$, $NaOCl$, $NiO_2$, $RuO_4$, $K_2FeO_4$, $OsO_4$, $KIO_4$, $NaIO_4$, $K_2RuO_4$, $PhIO$, $K_2Cr_2O_7$, Collins reagent ($CrO3$-2pyridine), pyridinium dichromate (PDC), and pyridinium chlorochromate(PCC).

Particularly preferred oxidation reagents include hypochlorite, peroxides, periodate oxidation reagents, iodine oxidation reagents, chloride oxidation reagents, oxygen, 03, or mixtures thereof. In a particularly preferred embodiment the oxidizing agent is a peroxide, particularly hydrogen peroxide.

One of ordinary skill in the art will appreciate that a wide variety of reaction conditions may be employed to promote oxidation of the polyol with an oxidizing reagent, therefore, a wide variety of reaction conditions are envisioned; see generally, March's Advanced Organic Chemistry: Reactions, Mechanisms, and Structure, M. B. Smith and J. March, 5th Edition, John Wiley & Sons, 2001. For example, in certain embodiments, the oxidizing reagent is a reagent which oxidizes a hydroxyl group to an aldehyde.

While in certain embodiments oxidation of the polyol may be carried out by reacting the polyol with one or more oxidation reagents, in certain embodiments it may be desirable to carry out the oxidation reaction in the presence of a metal ion. Suitable metal ions may be selected from the group consisting of $Zn^{2+}$, $Fe^{2+}$, $Fe^{3+}$, $Co^{3+}$, $Ni^{2+}$, $Mn^{2+}$, $Co^{2+}$, $Mg^{2+}$ and $Ca^{2+}$. For example, in a particularly preferred embodiment, the polyol is oxidized by reacting hydrogen peroxide in the presence of $Fe^{2+}$.

In certain embodiments the preparation of the cross-linking agent comprises reacting a polyol and oxidizing agent in the presence of an enzyme to inhibit further oxidation of aldehyde groups of the oxidized polyol to carboxyl groups. In particular embodiments, where the oxidizing agent is a peroxide, such as hydrogen peroxide, the enzyme may be selected from the group consisting of peroxidase, catalase and myeloperoxidase. In certain instances the enzyme is introduced at a point in the oxidation reaction so as to yield a mixture of oxidized sugar molecules having a greater concentration of aldehyde groups as compared to carboxyl group.

The cross-linked cellulosic fibers may be manufactured by treating a mat or web of cellulosic fibers with an aqueous solution of an oxidized polyol to provide treated fibers, which may optionally be separated-into treated individualized fibers, and heated for a time and at a temperature to effect drying and subsequently cured (i.e., to provide intra-fiber cross-linked cellulosic fibers). In certain embodiments the cellulose fibers are provided as a mat and are treated with the polyol by methods known in the art, including spraying, rolling or dipping such that the mat is impregnated with the cross-linking agent.

Preferably treatment of the cellulosic fiber with an oxidized polyol occurs at relatively low fiber consistencies, such as less than about 15 percent and more preferably less than about 10 percent and still more preferably less than about 5.0 percent, such as from about 1.0 to about 15 percent and more preferably from about 1.5 to about 5.0 percent. In certain embodiments the fiber may be dispersed in an aqueous solution, such as water to a first consistency and then partially dewatered prior to treatment with the oxidized polyol.

After treatment with an oxidized polyol the treated fiber is dewatered and dried to cure the reacted cellulosic fibers. Preferably drying is carried out at temperatures greater than about 100° C., more preferably greater than about 120° C., such as from about 100 to about 220° C. and more preferably from about 140 to about 200° C. For example, the treated fiber may be heated by exposing the fibers to heated air or a heated surface where the temperature of the air or surface is from about 140 to about 220° C. and more preferably from about 140 to about 200° C. One skilled in the art will appreciate that when exposed to the foregoing drying temperatures the actual temperature of the sheet will be less. In certain instances the treated fiber may be dried to a consistency from about 90 to about 95 percent during the curing step.

In one embodiment the cross-linked fibers, which have a moisture content after exiting the curing stage of from about 5 to about 10 percent, are treated with a bleaching agent to provide bleached cross-linked cellulosic fibers having further improved brightness and color. In one embodiment, the bleaching agent is hydrogen peroxide. In another embodiment, the bleaching agent is a combination of hydrogen peroxide and sodium hydroxide. Other suitable bleaching agents include peroxy acids (e.g. peracetic acid), sodium peroxide, chlorine dioxide, sodium chlorite, and sodium hypochlorite. Mixtures of bleaching agents may also be used. In another embodiment the cured cross-linked fibers are treated with an aqueous solution containing from about 0.2 kg hydrogen peroxide per ADMT (air dried metric ton) fiber to about 3 kg hydrogen peroxide per ADMT fiber. In another embodiment the cured cross-linked fibers are treated with an aqueous solution of hydrogen peroxide in combination with aqueous sodium hydroxide. In yet another embodiment the cured cross-linked fibers are treated with an aqueous solution of hydrogen peroxide to provide from about 0.2 kg hydrogen peroxide per ADMT fiber and about 0.7 kg sodium hydroxide per ADMT fiber to about 3 kg hydrogen peroxide per ADMT fiber and about 1.5 kg sodium hydroxide per ADMT fiber.

In general, the cellulose fibers may be prepared by a system and apparatus as described in U.S. Pat. No. 5,447,977 the contents of which are incorporated herein by reference in a manner consistent with the present disclosure. Briefly, the fibers are prepared by a system and apparatus that includes a conveying device for transporting a mat or web of cellulose fibers through a fiber treatment zone; an applicator for applying a treatment substance such as an aqueous solution of the crosslinking agent from a source to the fibers at the fiber treatment zone; a fiberizer for separating the individual cellulose fibers comprising the mat to form a fiber output comprised of substantially unbroken and essentially singulated cellulose fibers; a dryer coupled to the fiberizer for flash evaporating residual moisture; and a controlled temperature zone for additional heating of fibers for drying and an oven for curing the crosslinking agent, to form dried and cured individualized cross-linked fibers.

As used herein, the term "mat" refers to any nonwoven sheet structure comprising cellulose fibers or other fibers that are not covalently bound together. The fibers may include, for example, fibers obtained from wood pulp or other suitable sources of cellulose fibers that may be laid into a sheet. The mat of cellulose fibers is preferably in an extended sheet form, and may be one of a number of baled sheets of discrete size or may be a continuous roll. Each mat of cellulose fibers is transported by a conveying device, for example, a conveyor belt or a series of driven rollers. The conveying device carries the mats through the fiber treatment zone.

Cellulosic fibers useful for making cross-linked cellulosic fibers according to the present invention are generally derived from wood pulp. Suitable wood pulp fibers can be obtained from well-known chemical processes such as the kraft and sulfite processes, with or without subsequent bleaching. The pulp fibers may also be processed by thermomechanical, chemithermomechanical methods, or combinations thereof. The pulp fiber is produced by chemical methods. Ground wood fibers, recycled or secondary wood pulp fibers, and bleached and unbleached wood pulp fibers can be used. Wood pulp fibers may be derived from wood fibers having a high-average fiber length or low-average fiber length, or mixtures of the same. One example of suitable high-average length wood pulp fibers include softwood fibers such as, but not limited to, northern softwood, southern softwood, redwood, red cedar, hemlock, pine (e.g., southern pines), spruce (e.g., black spruce), combinations thereof, and the like. One example of suitable low-average length wood pulp fibers include hardwood fibers, such as, but not limited to, eucalyptus, maple, birch, aspen pulp fibers.

The wood pulp fibers can also be pretreated prior to use. This pretreatment may include physical treatment, such as subjecting the fibers to steam or chemical treatment. Although not to be construed as a limitation, examples of pretreating fibers include the application of fire retardants to the fibers, and surfactants or other liquids, such as solvents, which modify the surface chemistry of the fibers. Other pretreatments include incorporation of antimicrobials, pigments, and densification or softening agents. Fibers pretreated with other chemicals, such as thermoplastic and thermosetting resins also may be used. Combinations of pretreatments also may be employed.

At the fiber treatment zone, an aqueous solution of oxidized polyol is applied to the cellulose fibers. The oxidized polyol solutions are preferably applied to one or both surfaces of the mat using any one of a variety of methods known in the art, including spraying, rolling, or dipping The polyol may be applied to the cellulose sheet before the application of the oxidized polyol solution, with the oxidized polyol solution, or after the passage of the sheet through the fiberizer. In the latter case, the oxidized polyol can be injected into the hot air stream conveying the individualized fiber into the curing stage. Once the oxidized polyol has been applied to the mat, they may be uniformly distributed through the mat, for example, by passing the mat through a pair of rollers.

In certain embodiments it may be preferable to provide a catalyst when reacting the oxidized polyol and the mat of cellulosic fibers. Suitable catalysts include acids (such as hydrochloric, sulfuric, fluoboric, acetic, glycolic, maleic, lactic, citric, tartaric, and oxalic acids); metal salts (such as magnesium chloride, nitrate, fluoborate, or fluosilicate; zinc chloride, nitrate, fluoborate, or fluosilicate; ammonium chloride; zirconium oxychloride; sodium or potassium bisulfate); amine hydrochlorides (such as the hydrochloride of 2-amino-2-methyl-1-propanol); and the like, and mixtures thereof. The amount of catalyst generally is about 0.01 to 10 percent, and preferably about 0.05 to 5 percent, based on the weight of the cellulosic fiber.

After the fibers have been treated with the oxidized polyol, the impregnated mat is fiberized by feeding the mat through a fiberizer. The fiberizer serves to disintegrate the mat into its component individual cellulose fibers, which are then air conveyed through a drying unit to remove the residual moisture. In one embodiment, the fibrous mat is wet fiberized.

The pulp is then air conveyed through an additional heating zone to bring the temperature of the pulp to the cure temperature. In one embodiment, the dryer comprises a first drying zone for receiving the fibers and for removing residual moisture from the fibers via a flash-drying method and a second heating zone for curing the crosslinking agent. Alternatively, in another embodiment, the treated fibers are blown through a flash-dryer to remove residual moisture, heated to a curing temperature, and then transferred to an oven where the treated fibers are subsequently cured. Overall, the treated fibers are dried and then cured for a sufficient time and at a sufficient temperature to effect crosslinking. Typically, the fibers are oven-dried and cured for about 15 seconds to about 20 minutes at a temperature from about 120 to about 200° C. After curing the unbleached fibers, usually at about 5 to about 10 percent total moisture, are treated with a bleaching agent to increase the color and brightness properties.

As the instant cross-linked fibers are readily dispersible in water and form sheets having few knits or knots they are well suited to manufacturing tissue webs and products using a wide range of known techniques, such as, adhesive creping, wet creping, double creping, wet-pressing, air pressing, through-air drying, creped through-air drying, uncreped through-air drying, as well as other steps in forming the paper web. In a particularly preferred embodiment the cross-linked fibers of the present invention are used in the manufacture of tissue webs by non-compressive dewatering and drying methods, such as through-air drying. Through-air dried tissue webs may be either creped or uncreped. Examples of suitable tissue manufacturing methods are disclosed in U.S. Pat. Nos. 5,048,589, 5,399,412, 5,129,988 and 5,494,554, all of which are incorporated herein in a manner consistent with the present disclosure. When forming multi-ply tissue products, the separate plies can be made from the same process or from different processes as desired.

Generally the cross-linked fibers are incorporated in tissue webs and products in an amount sufficient to alter at least one physical property of the web or product, such as sheet bulk, tensile, stiffness, or the like. As such, the resulting tissue webs and products may comprise from about 5 to about 75 percent, preferably from about 10 to about 60 percent, more preferably from about 20 to about 50 percent, and still more preferably from about 25 to about 45 percent, cross-linked cellulosic fibers.

To form tissue webs and products, cross-linked cellulosic fibers are generally combined with conventional non-cross-linked fibers to form a homogenous tissue web, or incorporated into one or more layers of a layered tissue web. The non-cross linked fibers may generally comprise any conventional papermaking fiber, which are well known in the art. For example, non-cross-linked fibers may comprise wood pulp fibers formed by a variety of pulping processes, such as kraft pulp, sulfite pulp, thermomechanical pulp, etc. Further, the wood pulp fibers may comprise high-average fiber length wood pulp fibers or low-average fiber length wood pulp fibers, as well as mixtures of the same. One example of suitable high-average length wood pulp fibers include softwood fibers such as, but not limited to, northern softwood, southern softwood, redwood, red cedar, hemlock, pine (e.g., southern pines), spruce (e.g., black spruce), combinations thereof, and the like. One example of suitable low-average length wood pulp fibers include hardwood fibers, such as, but not limited to, eucalyptus, maple, birch, aspen, and the like, which can also be used. Moreover, if desired, secondary fibers obtained from recycled materials may be used, such as fiber pulp from sources such as, for example, newsprint, reclaimed paperboard, and office waste.

The non-cross-linked fibers are generally combined with cross-linked fibers, such as by blending or layering, to produce tissue webs and products. In certain instances the cross-linked cellulosic fibers may be selectively disposed in one or more layers and the product may comprise from about 10 to about 50 percent, by weight of the product, cross-linked fibers. In other embodiments it may be preferred to arrange the cross-linked fibers in a layered tissue structure such that at least one of the layers is substantially free from cross-linked fibers. For example, cross-linked and conventional fibers may be arranged in layers such that the tissue structure has a first layer comprising cross-linked cellulosic fibers and a second layer comprising non-cross-linked cellulosic fibers such as conventional wood pulp fibers, such as northern softwood kraft fibers or hardwood kraft fibers, where the second layer is substantially free of cross-linked fibers. In such embodiments the cross-linked fiber may be added to a given layer, such that the layer comprises greater than about 2.0 percent, by weight of the layer, cross-linked fiber, such as from about 2.0 to about 100 percent and more preferably from about 30 to about 70 percent.

In other embodiments the cross-linked cellulosic fibers are selectively incorporated into two layers of a three-layered tissue web and more preferably the outer layers of a three-layered tissue web. For example, the cross-linked cellulosic fibers may comprise cross-linked eucalyptus hardwood kraft pulp fibers (EHWK) which may be selectively incorporated in the outer layers of a three-layered tissue structure where the center layer comprises non-cross-linked cellulosic fibers, such as non-cross-linked Northern softwood kraft fiber (NSWK). In further embodiments it may be preferred that the two outer layers be substantially free from cross-linked cellulosic fiber, such as cross-linked EHWK.

Accordingly, in one embodiment the present disclosure provides a multi-layered tissue web comprising cross-linked fibers selectively disposed in one or more layers, wherein the tissue layer comprising cross-linked fibers is adjacent to a layer comprising non-cross-linked fiber and which is substantially free from non-cross-linked fiber. In a particularly preferred embodiment, the tissue product comprises at least one multi-layered web where non-cross-linked fibers are disposed in the middle layer, which is substantially free from cross-linked fiber, and the first and third layers comprise cross-linked fibers wherein the tissue product has a basis weight from about 30 to about 50 grams per square meter (gsm), a geometric mean tensile (GMT) greater than about 600 g/3" and a sheet bulk greater than about 10 cc/g.

In still other embodiments the present invention provides a tissue product comprising a tissue web having three layers where the middle layer comprises cross-linked cellulosic fibers and the two outer layers are substantially free from cross-linked cellulosic fibers.

While the foregoing structures represent certain preferred embodiments it should be understood that the tissue product can include any number of plies or layers and can be made from various types of conventional unreacted cellulosic fibers and cross-linked fibers. For example, the tissue webs may be incorporated into tissue products that may be either single- or multi-ply, where one or more of the plies may be formed by a multi-layered tissue web having cross-linked fibers selectively incorporated in one of its layers.

Compared to similar tissue products prepared without cross-linked fibers, tissue products prepared according to the present disclosure are generally of comparable strength (measured as GMT) yet have significantly higher sheet bulk. Thus, in certain embodiments the present invention provides a tissue product comprising from about 5 to about 50 percent, and more preferably from about 10 to about 30 percent, by weight of the weight of the web, cross-linked fiber, wherein the product has a basis weight from about 20 to about 50 gsm, a GMT from about 600 to about 800 g/3", a sheet bulk greater than about 10 cc/g, such as from about 10 to about 25 cc/g and more preferably from about 12 to about 20 cc/g.

The basis weight of tissue webs made in accordance with the present disclosure can vary depending upon the final product. For example, the process may be used to produce bath tissues, facial tissues, and the like. In general, the basis weight of the tissue web may vary from about 10 to about 50 gsm and more preferably from about 25 to about 45 gsm. Tissue webs may be converted into single- and multi-ply bath or facial tissue products having a basis weight from about 20 to about 50 gsm and more preferably from about 25 to about 45 gsm.

TEST METHODS

Tensile

Tensile testing was done in accordance with TAPPI test method T-576 "Tensile properties of towel and tissue products (using constant rate of elongation)" wherein the testing is conducted on a tensile testing machine maintaining a constant rate of elongation and the width of each specimen tested is 3 inches. More specifically, samples for dry tensile strength testing were prepared by cutting either a 3 inch±0.05 inch (76.2 mm±1.3 mm) or 1 inch±0.05 inch, wide strip in either the machine direction (MD) or cross-machine direction (CD) orientation using a JDC Precision Sample Cutter (Thwing-Albert Instrument Company, Philadelphia, PA, Model No. JDC 3-10, Serial No. 37333) or equivalent. The instrument used for measuring tensile strengths was an MTS Systems Sintech 11S, Serial No. 6233. The data acquisition software was an MTS TestWorks® for Windows Ver. 3.10 (MTS Systems Corp., Research Triangle Park, NC). The load cell was selected from either a 50 Newton or 100 Newton maximum, depending on the strength of the sample being tested, such that the majority of peak load values fall between 10 to 90 percent of the load cell's full scale value. The gauge length between jaws was 4±0.04 inches (101.6±1 mm) for facial tissue and towels and 2±0.02 inches (50.8±0.5 mm) for bath tissue. The crosshead speed was 10±0.4 inches/min (254±1 mm/min), and the break sensitivity was set at 65 percent. The sample was placed in the jaws of the instrument, centered both vertically and horizontally. The test was then started and ended when the specimen broke. The peak load was recorded as either the "MD tensile strength" or the "CD tensile strength" of the specimen depending on direction of the sample being tested. Ten representative specimens were tested for each product or sheet and the arithmetic average of all individual specimen tests was recorded as the appropriate MD or CD tensile strength the product or sheet in units of grams of force per 3 inches of sample. The geometric mean tensile (GMT) strength was calculated and is expressed as grams-force per 3 inches of sample width. Slope is also calculated by the tensile tester and recorded in units of kg.

Water Retention Value

The water retention value (WRV) of a pulp specimen is a measure of the water retained by the wet pulp specimen after centrifuging under standard conditions. WRV can be a useful tool in evaluating the performance of pulps relative to dewatering behavior on a tissue machine. One suitable method for determining the WRV of a pulp is TAPPI Useful Method 256, which provides standard values of centrifugal force, time of centrifuging, and sample preparation. Various commercial test labs are available to perform WRV testing using the TAPPI test or a modified form thereof.

EXAMPLE

Oxidized Sucrose: Three different crosslinking agents were prepared by oxidizing sucrose as follows:

Sucrose was oxidized substantially by first dissolving 16.25 g of sucrose in DI water. Approximately 31.26 g of sodium metaperiodate was added and the colorless solution was stirred overnight at room temperature. The solution was placed on a salt/ice bath and cooled to about 5° C. To remove iodate from the solution, Barium dichloride dihydrate, was added with stirring. A white precipitate was observed and stirring was continued for 30 minutes. The oxidized sucrose (referred to herein as OS1) was then filtered, washed with DI water and used without further purification.

Sucrose was also oxidized by dissolving 387.17 g of sucrose in DI water. Sodium metaperiodate (51.73 g) was added to the sucrose solution and the colorless solution was stirred overnight at room temperature. After stirring overnight a fine white precipitate was observed. The solution was filtered through a glass fritted funnel. The oxidized sucrose (referred to herein as OS2) filtrate solution was used without further purification.

A third oxidized sucrose was prepared by mixing 34.462 g of sucrose in DI water and then mixing, 7.628 g $MgCl_2 \cdot 6H_2O$, 1.204 g $FeSO4 \cdot 7H_2O$, to dissolve the reagents. The flask was placed on an ice bath; then 21.824 g of 30 percent $H_2O_2$ was added over about 30 minutes. The solution was stirred overnight at room temperature and the precipitated oxidized sucrose (referred to herein as OS3) was used without purification.

Cross-linked Fiber: Oxidized sucrose, prepared as described above, was used to prepare cross-linked fiber by reacting the oxidized sucrose with Eucalyptus hardwood kraft pulp, as set forth in Table 1, below. Eucalyptus hardwood kraft pulp was dispersed in water and disintegrated in a British disintegrator (15K revolutions). The pulp slurry was dewatered to yield a wet crumb, which was treated with the oxidized sucrose and Catalyst 531 ($MgCl_2 \cdot 6H_2O$, Omnova Solutions) and mixed in a household mixer for 5 minutes. The treated fiber was air-dried overnight at room temperature and then fiberized in an Osterizer blender. The fiber was individualized at a high setting for about 60-120 seconds until nits/clumps were minimized. After fiberization the fibers were made into a 100 gsm air-laid handsheet, which was heated in a Mathis through-air dryer. In certain instances the fiberized cross-linked fibers where bleached by using a solution containing NaOCl and hydrogen peroxide.

TABLE 1

| Sample | Oxidized Polyol | Pulp Weight (g) | Oxidized Polyol Weight (g) | Oxidized Polyol Add on (%) | Cure Temperature (° C.) | Cure Time (min) | Bleached |
|---|---|---|---|---|---|---|---|
| 1 | OS1 | 40.11 | 8.14 | 20 | 180 | 5 | NO |
| 2 | OS1 | 40.29 | 8.09 | 20 | 180 | 5 | YES |
| 3 | OS2 | 60.16 | 6.73 | 11 | 150 | 5 | YES |
| 4 | OS3 | 35.92 | 9.30 | 26 | 150 | 5 | YES |

The cross-linked fibers were used to prepare handsheets using a Valley Handsheet mold, 8×8 inches. Handsheets were approximately 7.5×7.5 inches and had a basis weight of about 60 grams per square meter. The sheet mold forming wire was a 90×90 mesh, stainless-steel wire cloth, with a wire diameter of 0.0055 inch. The backing wire was a 14×14 mesh with a wire diameter of 0.021 inch, plain weave bronze. Taking a sufficient quantity of the thoroughly mixed stock to produce a handsheet of about 60 grams per square meter, the stock container of the sheet mold was clamped in position on the wire. Several inches of water was allowed to rise above the wire. The measured stock was added and the mold was filled with water up to a mark of 6 inches above the wire. The perforated mixing plate was inserted into the mixture in the mold and slowly moved down and up 7 times. The water leg drain valve was immediately opened. When the water and stock mixture drained down to and disappeared from the wire, the drain valve was closed. The cover of the sheet mold was raised. A clean, dry blotter was carefully placed on the formed fibers. The dry couch roll was placed at the front edge of the blotter. The fibers adhering to the blotter were couched off the wire by one passage of the couching roll, without pressure, from front to back of wire.

The blotter with the fiber mat adhering to it was placed in the hydraulic press, handsheet up, on top of two used, re-dried blotters. Two new blotters were placed on top of the handsheet. The press was closed and clamped. Pressure was applied to give a gauge reading that produced 75 PSI on the area of the blotter affected by the press. This pressure was maintained for exactly one minute. The pressure on the press was then released. The press was opened and the handsheet was removed.

The handsheet was placed on the polished surface of the sheet dryer (Valley Steam hot plate). The canvas cover was carefully lowered over the sheet. The 13 lb. dead weight was fastened to the lead filled brass tube. The sheet was allowed to dewater and dry for two minutes. The surface temperature, with the cover removed, averaged about 100° C. A control handsheet comprising 100 percent non-cross-linked fiber was prepared in a similar fashion. The properties of the resulting handsheets are summarized in Table 2, below.

TABLE 2

| Sample | Handsheet Weight (g) | Caliper (mil) | Bulk (cc/g) | Delta Bulk (%) | WRV (g/g) |
|---|---|---|---|---|---|
| Control | 2.18 | 6.82 | 2.88 | — | 1.33 |
| 1 | 2.18 | 15.66 | 6.64 | 130 | 0.47 |
| 2 | 2.44 | 15.85 | 5.99 | 108 | — |
| 3 | 1.85 | 7.22 | 3.60 | 25 | — |
| 4 | 1.96 | 12.3 | 5.82 | 102 | — |

What is claimed is:

1. A method of manufacturing cross-linked wood pulp fibers comprising the steps of providing a plurality of wood pulp fibers, forming the plurality of wood pulp fibers into a mat having a fiber consistency from about 1.0 to about 10 percent, treating the mat with an oxidized polyol to yield treated wood pulp fibers and drying the treated wood pulp fibers at a temperature from about 140 to about 200° C. to yield a dried cross-linked wood pulp fibers having a consistency greater than about 90 percent.

2. The method of claim 1 wherein the oxidized polyol comprises an oxidized sugar having at least two aldehyde groups and wherein the sugar is selected from the group consisting of glucose, fructose, sucrose, maltose, lactose, mannose, xylose, raffinose, stachyose, and mixtures thereof.

3. The method of claim 1 further comprising the step of fiberizing the treated wood pulp fibers prior to the drying step.

4. The method of claim 1 further comprising the step of treating the mat of wood pulp fiber with a catalyst selected from the group consisting of an acid, a metal salt, and amine hydrochlorides, and mixtures thereof.

5. The method of claim 4 wherein the catalyst comprises a magnesium salt selected from the group consisting of magnesium carbonate, magnesium chloride, magnesium sulfate, and—mixtures thereof.

6. The method of claim 1 further comprising the step of treating the mat of wood pulp fiber with a metal ion selected from the group consisting of $Zn^{2+}$, $Fe^{2+}$, $Fe^{3+}$, $Co^{3+}$, $Ni^{2+}$, $Mn^{2+}$, $Co^{2+}$, $Mg^{2+}$ and $Ca^{2+}$, and mixtures thereof.

7. The method of claim 1 wherein the oxidized polyol is provided as an aqueous solution and the step of treating the mat comprises applying the aqueous oxidized polyol to the mat by spraying, rolling or dipping.

8. The method of claim 1 wherein the mat of wood pulp fiber is treated with from about 50 to about 200 kg of oxidized polyol per metric ton of fiber, on a dry weight basis.

9. The method of claim 1 wherein the wood pulp fibers comprise unbleached wood pulp fibers.

10. The method of claim 1 further comprising the step of bleaching the treated fiber by reacting the fiber with hydrogen peroxide.

* * * * *